(12) United States Patent
Raghunathan et al.

(10) Patent No.: US 12,300,225 B2
(45) Date of Patent: *May 13, 2025

(54) AUTOMATIC SPEECH RECOGNITION CORRECTION

(71) Applicant: Cisco Technology, Inc., San Jose, CA (US)

(72) Inventors: Karthik Raghunathan, Sunnyvale, CA (US); Arushi Raghuvanshi, San Francisco, CA (US); Vijay Ramakrishnan Thimmaiyah, San Francisco, CA (US); Lucien Serapio Carroll, San Leandro, CA (US); Varsha Ravikumar Embar, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 267 days.

This patent is subject to a terminal disclaimer.

(21) Appl. No.: 17/934,372

(22) Filed: Sep. 22, 2022

(65) Prior Publication Data

US 2023/0019978 A1 Jan. 19, 2023

Related U.S. Application Data

(63) Continuation of application No. 16/261,511, filed on Jan. 29, 2019, now Pat. No. 11,482,213.

(Continued)

(51) Int. Cl.
  *G10L 15/02* (2006.01)
  *G10L 15/06* (2013.01)
  (Continued)

(52) U.S. Cl.
  CPC ............ *G10L 15/187* (2013.01); *G10L 15/02* (2013.01); *G10L 15/063* (2013.01); *G10L 15/22* (2013.01); *G10L 2015/025* (2013.01)

(58) Field of Classification Search
  CPC ..... G10L 15/187; G10L 15/02; G10L 15/063; G10L 15/22; G10L 2015/025; G10L 15/32; G10L 15/183
  (Continued)

(56) References Cited

U.S. PATENT DOCUMENTS 7,383,172 B1 6/2008 Jamieson
7,565,282 B2 7/2009 Carus et al.
(Continued)

FOREIGN PATENT DOCUMENTS

CN 107451121 A 12/2017
EP 3270374 A1 1/2018

OTHER PUBLICATIONS

International Search Report and Written Opinion for PCT application No. PCT/US2019/042397, issued on Nov. 29, 2019, 12 pages.
(Continued)

*Primary Examiner* — Abul K Azad
(74) *Attorney, Agent, or Firm* — Polsinelli P.C.

(57) ABSTRACT

Systems, methods, and computer-readable media for correcting transcriptions created through automatic speech recognition. A transcription of speech created using an automatic speech recognition system can be received. One or more domain-specific contexts associated with the speech can be identified and a text span that includes a mistranscribed entry can be recognized from the speech based on the one or more domain-specific contexts. Additionally, features can be extracted from the mistranscribed entry and the extracted features can be matched against an index of domain-specific entries to identify a correct entry of the mistranscribed entry. Subsequently, the transcription can be corrected by replacing with the mistranscribed entry with the correct entry.

20 Claims, 9 Drawing Sheets

Related U.S. Application Data

(60) Provisional application No. 62/701,060, filed on Jul. 20, 2018.

(51) Int. Cl.
*G10L 15/187* (2013.01)
*G10L 15/22* (2006.01)

(58) Field of Classification Search
USPC .......................................................... 704/235
See application file for complete search history.

(56) References Cited

U.S. PATENT DOCUMENTS

| | | | |
|---|---|---|---|
| 8,521,526 B1 | 8/2013 | Llyod et al. | |
| 8,862,467 B1 | 10/2014 | Casado et al. | |
| 9,405,823 B2 | 8/2016 | Mamou et al. | |
| 9,576,578 B1 | 2/2017 | Skobeltsyn et al. | |
| 11,024,308 B2* | 6/2021 | Printz | G10L 15/1815 |
| 11,482,213 B2* | 10/2022 | Raghunathan | G10L 15/32 |
| 2006/0004570 A1 | 1/2006 | Ju et al. | |
| 2011/0077942 A1 | 3/2011 | Ljolje et al. | |
| 2014/0040713 A1 | 2/2014 | Dzik et al. | |
| 2017/0148432 A1* | 5/2017 | Jaramillo | G10L 15/005 |
| 2021/0042477 A1* | 2/2021 | Lewis | G06F 40/58 |

OTHER PUBLICATIONS

Wikipedia, "tf-idf," XP002765232, Jul. 2, 2018, 3 pages.
English Abstract CN107451121, retrieved from Google Patents Oct. 19, 2022, 10 pages.

* cited by examiner

AUTOMATIC SPEECH RECOGNITION CORRECTION

RELATED APPLICATIONS

This application is a continuation of U.S. patent Ser. No. 16/261,511, filed on Jan. 29, 2019, entitled "AUTOMATIC SPEECH RECOGNITION CORRECTION," which in turn, claims the benefit of U.S. Provisional Application No. 62/701,060, filed Jul. 20, 2018, entitled "AUTOMATIC SPEECH RECOGNITION CORRECTION", which is incorporated by reference in its entirety.

TECHNICAL FIELD

The present technology pertains to automatic speech recognition correction, and in particular to correcting a mistranscribed entry in a transcription of speech created through automatic speech recognition.

BACKGROUND

General purpose Automatic Speech Recognition (ASR) has improved by a large margin in recent years, with a reported word error rate (WER) of less than 10% for English voice search queries. However for domain-specific vocabulary, uncommon terms like proper nouns, non-native English accents, and noisy acoustic settings, the WER is still high. Since ASR is the first component in a spoken dialog system, errors introduced in the recognized transcript cascade to downstream natural language understanding (NLU) components, leading to unsatisfactory user experiences.

Specifically, current ASR systems mistranscribe domain and context-specific words and phrases. In particular, current ASR models are not trained on vocabulary within specific domains and specific contexts. This is problematic since ASR systems are the gateway component for voice assistants and any errors in transcription cascade to the dependent natural language understanding components of such an assistant. For example, a customer might ask "Could you call Xuchang Li?" An ASR system could transcribe the question to "Could you call Zoo Shang Lee?" In response to this transcription, a voice assistant might ask the customer "Should I make a call to Zhu Shangli?," which is unrelated to the question asked by the customer. Therefore, there exist needs for correcting domain and context-specific words and phrases recognized through ASR. In particular, there exist needs for correcting mistranscribed domain and context-specific words and phrases in a transcript created through ASR.

Further, different vendors, e.g. Google® and SoundHound®, typically offer different "out of the box" ASR systems. As discussed previously, such ASR systems are trained using generic vocabulary and not on vocabulary within specific domains and contexts, leading to transcription errors. Further, as different vendors provided their own different ASR systems, mistranscribed words and phrases can vary across different ASR systems/corresponding vendors that were used to create transcriptions. Therefore, there exist needs for correcting domain and context-specific words and phrases in transcriptions created using different "out of the box" ASR systems provided by different vendors. Specifically, there exist needs for correcting ASR transcriptions for specific domains and contexts agnostic as to the vendors/ASR models used to create ASR-based transcriptions.

Training a domain-specific ASR system from scratch could improve the WER for domain vocabulary, non-native accents and noisy acoustic environments, but doing so requires massive amounts of data. The cost to collect this data and develop a model that is both on par with a generic ASR system for generic vocabulary and more accurate for domain-specific vocabulary is often prohibitively high. Further, many off the shelf ASR systems prevent access to ASR models, thereby limiting how customers can augment the models according to the own data of the customers to account for domains and domain-specific contexts. Even off the shelf ASR systems that do allow customers to modify ASR models with the customer's own data, are not suited for allowing customers to tailor the models to perform recognition based on domains and domain specific contexts. In particular, as discussed previously, the large amounts of data required to train ASR systems for performing speech recognition based on domains and domain-specific contexts make it difficult for customers to modify such off the shelf ASR systems or to build a custom ASR system with data related to domains and domain-specific contexts. All of these deficiencies limit application of domains and domain-specific contexts to ASR, thereby creating needs for correcting ASR transcriptions based on specific domains and domain-specific contexts. In particular, for industry applications it can be practical to use generic ASR systems which can be easily leveraged via APIs while correcting mistranscribed terms in downstream tasks.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
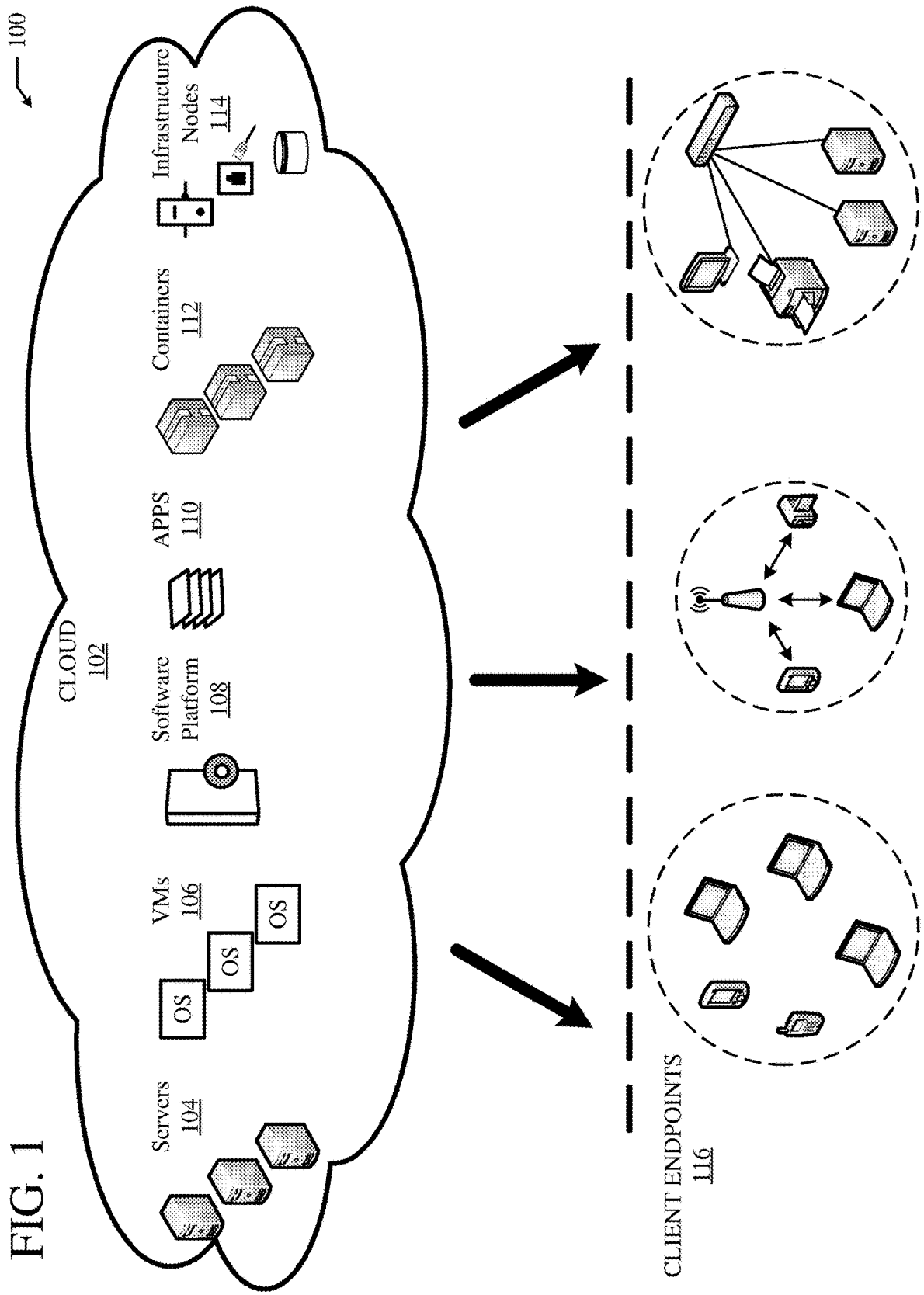
FIG. 1 illustrates a diagram of an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include receiving a transcription of speech created using an ASR system. One or more domain-specific contexts associated with the speech can be identified. Additionally, a text span from the transcription that includes a mistranscribed entry of the speech can be recognized based on the one or more domain-specific contexts associated with the speech. Features from the mistranscribed entry can be extracted and then matched against an index of domain-specific entries to identify a correct entry of the mistranscribed entry. Subsequently, the transcription can be corrected by replacing the mistranscribed entry with the correct entry.

A system can include one or more processors and at least one computer-readable storage medium storing instructions which, when executed by the one or more processors, cause the one or more processors to receive a transcript of speech created using an ASR system. The instructions can also cause the one or more processors to identify one or more domain-specific contexts associated with the speech. Further, the instructions can cause the one or more processors to apply one or more domain-specific extractors to the transcript to recognize a text span from the transcription that includes a mistranscribed entry of the speech based on the one or more domain-specific contexts associated with the speech. The instructions can cause the one or more processors to extract features from the mistranscribed entry and match the extracted features against an index of domain-specific entries to identify a correct entry of the mistranscribed entry. Further, the instructions can cause the one or more processors to correct the transcription by replacing the mistranscribed entry with the correct entry.

A non-transitory computer-readable storage medium having stored therein instructions which, when executed by a processor, cause the processor to receive a transcription of speech created using an ASR system. The instructions can cause the processor to identify one or more domain-specific contexts associated with the speech. Further, the instructions can cause the processor to recognize a text span from the transcription that includes a mistranscribed entry of the speech based on the one or more domain-specific contexts associated with the speech. The instructions can also cause the processor to extract features from the mistranscribed entry and match the extracted features against an index of domain-specific entries to identify a correct entry of the mistranscribed entry using term frequency-inverse document frequency-based information retrieval. The instructions can subsequently cause the processor to correct the transcription by replacing the mistranscribed entry with the correct entry.

Example Embodiments

The disclosed technology addresses the need in the art for correcting ASR transcriptions. The present technology involves system, methods, and computer-readable media for correcting entries in transcripts created through ASR.

Figure 6:
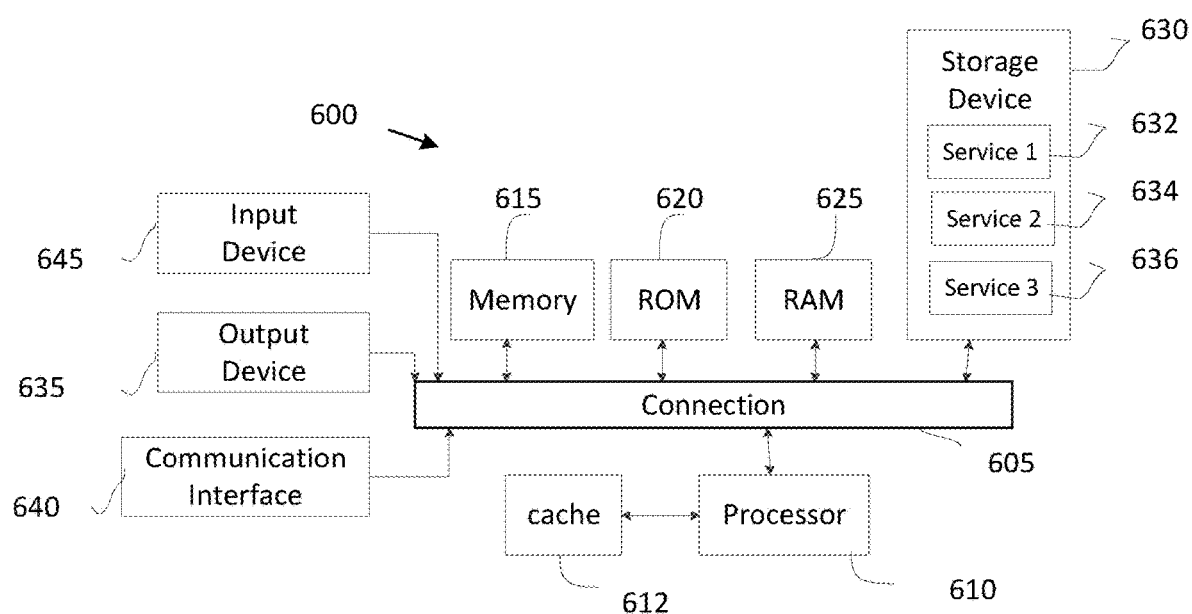
FIG. 6 shows an example computing system in which the components of the system are in communication with each other using connection.
Figure 7:
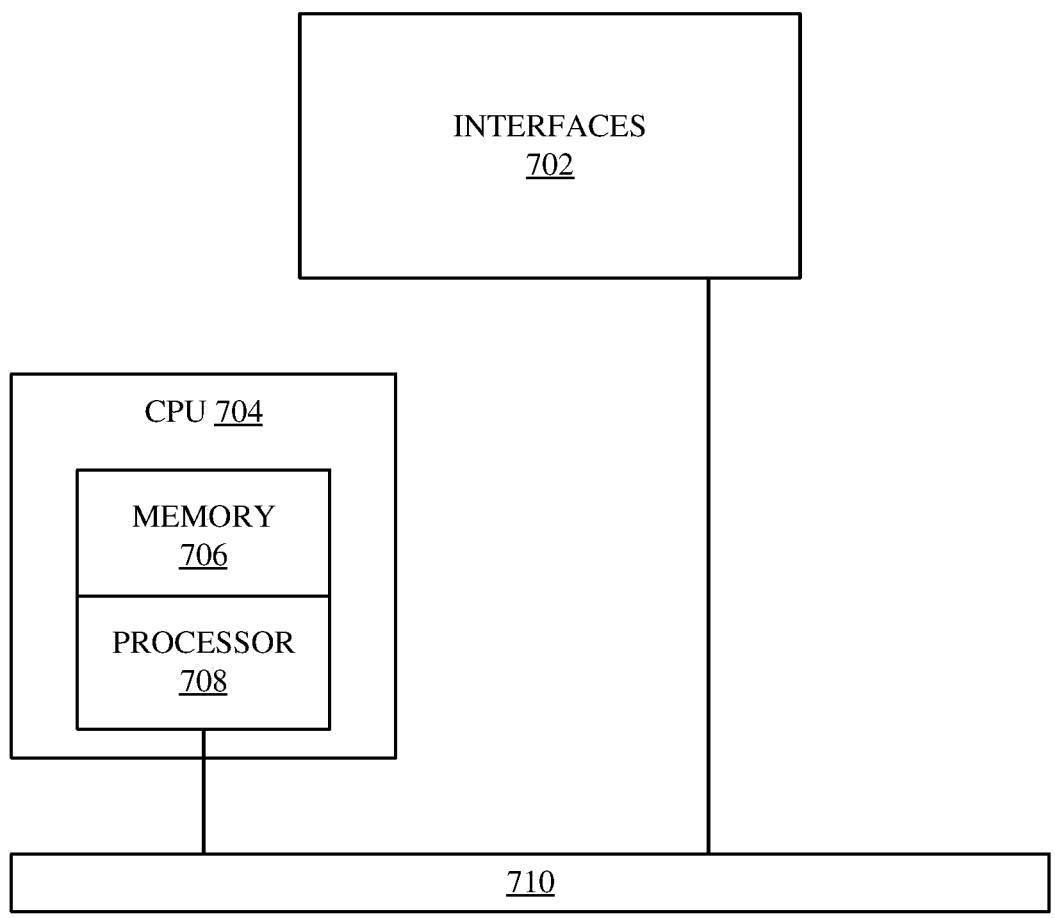
FIG. 7 illustrates an example network device suitable for performing switching, routing, load balancing, and other networking operations.

A description of a network environment for network data access and services, as illustrated in FIG. 1, is first disclosed herein. A discussion of systems and methods for correcting ASR transcriptions, as shown in FIGS. 2-5, will then follow. The discussion then concludes with a brief description of example devices, as illustrated in FIGS. 6 and 7. These variations shall be described herein as the various embodiments are set forth. The disclosure now turns to FIG. 1.

FIG. 1 illustrates a diagram of an example cloud computing architecture 100. The architecture can include a cloud 102. The cloud 102 can include one or more private clouds, public clouds, and/or hybrid clouds. Moreover, the cloud 102 can include cloud elements 104, 106, 108, 11, 112, and 114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

The example architecture 100 shown in FIG. 1 can be used to implement an applicable transcription correction system, such as the transcription correction systems described herein. Further, the example architecture 100 shown in FIG. 1 can be used to implement an applicable technique for performing transcription correction, such as the techniques and methods described herein.

The disclosure now turns to a discussion of correction of transcripts created through ASR. General purpose ASR has improved by a large margin in recent years, with a reported WER of less than 10% for English voice search queries. However for domain-specific vocabulary, uncommon terms like proper nouns, non-native English accents, and noisy acoustic settings, the WER is still high. Since ASR is the first component in a spoken dialog system, errors introduced in the recognized transcript cascade to downstream NLU components, leading to unsatisfactory user experiences.

Specifically, current ASR systems mistranscribe domain and context-specific words and phrases. In particular, current ASR models are not trained on vocabulary within specific domains and specific contexts. This is problematic since ASR systems are the gateway component for voice assistants and any errors in transcription cascade to the dependent natural language understanding components of such an assistant. For example, a customer might ask "Could you call Xuchang Li?" An ASR system could transcribe the question to "Could you call Zoo Shang Lee?" In response to this transcription, a voice assistant might ask the customer "Should I make a call to Zhu Shangli?," which is unrelated to the question asked by the customer. Therefore, there exist needs for correcting domain and context-specific words and phrases recognized through ASR. In particular, there exist needs for correcting mistranscribed domain and context-specific words and phrases in a transcript created through ASR.

In particular, generic ASR systems perform poorly/mistranscribe speech on enterprise collaboration use-case type queries. For example, the intended query "join the WebEx meeting with Ashley Tuttle" can get mistranscribed to "join the web meeting with Ashton puddles". Domain-specific information in the form of "hints", which is a list of words for monitoring by the ASR system, can be provided to these systems. The ASR system then biases the transcription to those words, correcting "rabbits" to "WebEx". However, current systems do not scale for large amounts of domain data. Specifically, there could be 100,000 people in an enterprise and current systems do not provide the capability to ingest such data. Moreover, current systems operate agnostic to company specific interaction data like Bob is the manager of Alice and Alice called Alex three times yesterday.

Further, different vendors, e.g. Google® and SoundHound®, typically offer different "out of the box" ASR systems. As discussed previously, such ASR systems are trained using generic vocabulary and not on vocabulary within specific domains and contexts, leading to transcription errors. Further, as different vendors provided their own and different ASR systems, mistranscribed words and phrases can vary across different ASR systems/corresponding vendors that were used to create transcriptions. Therefore, there exist needs for correcting domain and context-specific words and phrases in transcriptions created using different "out of the box" ASR systems provided by different vendors. Specifically, there exist needs for correcting ASR transcriptions for specific domains and contexts agnostic as to the vendors/ASR models used to create ASR-based transcriptions.

Training a domain-specific ASR system from scratch could improve the WER for domain vocabulary, non-native accents and noisy acoustic environments, but doing so requires massive amounts of data. The cost to collect this data and develop a model that is both on par with a generic ASR system for generic vocabulary and more accurate for domain-specific vocabulary is often prohibitively high. Further, many off the shelf ASR systems prevent access to ASR models, thereby limiting how customers can augment the models according to the own data of the customers to account for domains and domain-specific contexts. Even off the shelf ASR systems that do allow customers to modify ASR models with the customer's own data, are not suited for allowing customers to tailor the models to perform recognition based on domains and domain specific contexts. In particular, as discussed previously, the large amounts of data required to train ASR systems for performing speech recognition based on domains and domain-specific contexts make it difficult for customers to modify such off the shelf ASR systems or to build a custom ASR system with data related to domains and domain-specific contexts. All of these deficiencies limit application of domains and domain-specific contexts to ASR, thereby creating needs for correcting ASR transcriptions based on specific domains and domain-specific contexts. In particular, for industry applications it can be practical to use generic ASR systems which can be easily leveraged via APIs while correcting mistranscribed terms in downstream tasks.

In order to address these challenges, transcriptions can be corrected based on domain-specific contexts related to speech used to create a transcription. This can overcome the deficiencies of current ASR systems that create transcriptions without taking into account domains and contexts related to transcribed speech. Further, transcriptions can be corrected, e.g. based on context and domain, after the transcriptions are actually created and irrespective of a vendor/ASR model used to create the transcriptions. Therefore, transcriptions can be corrected across different vendors/ASR models irrespective of differences in transcribed speech, potentially the same transcribed speech, created through the use of different vendors/ASR models.

Figure 2A:
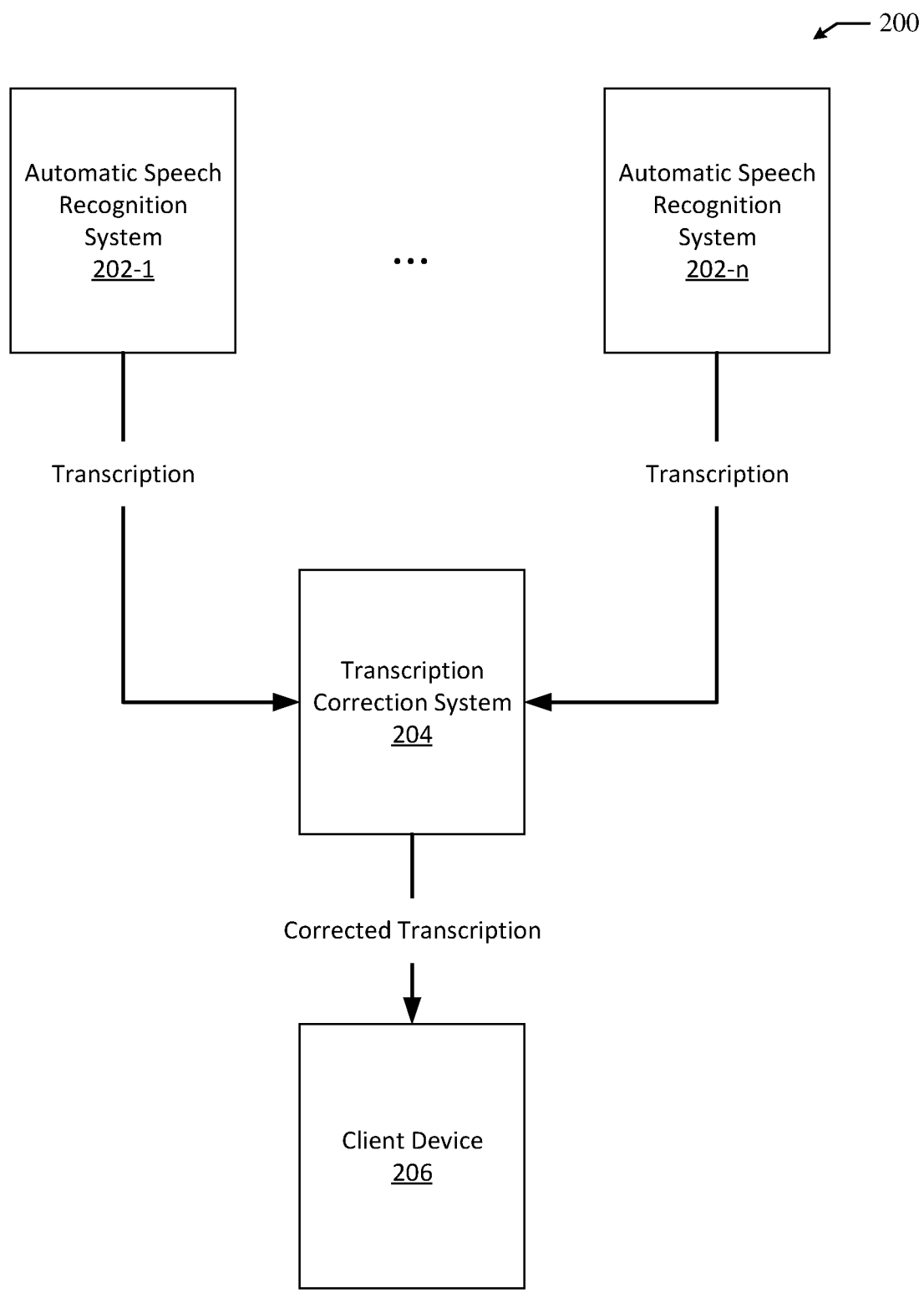
FIG. 2A shows an example environment for correcting transcriptions.

FIG. 2A shows an example environment 200 for correcting transcriptions. Specifically, the environment 200 can be used to correct transcriptions based on contexts and domains associated with the transcribed speech. The example environment 200 shown in FIG. 2A includes automatic speech recognition systems 202-1 . . . 202-n (herein referred to as "automatic speech recognition systems 202"), a transcription correction system 204, and a client device 206.

The automatic speech recognition systems 202 function to generate transcriptions of speech using ASR. Specifically, the automatic speech recognition systems 202 can use ASR models to create transcriptions of speech. The automatic speech recognition systems 202 can represent different instances of the same transcription vendor. For example, the automatic speech recognition systems 202 can represent different instances of a Google® transcription service functioning to generate speech transcripts using ASR. Alternatively, the automatic speech recognition systems 202 can represent different transcription vendors. For example, the automatic speech recognition systems 202 can represent a Google® transcription service functioning to generate speech transcriptions using ASR as well as a Soundhound® transcription service functioning to generate speech transcriptions using ASR.

The transcription correction system 204 functions to correct transcriptions generated by the automatic speech recognition systems 202. Specifically, the transcription correction system 204 can receive speech transcriptions from the automatic speech recognition systems 202 and subsequently correct the speech transcriptions. The transcription correction system 204 can receive, and subsequently correct, transcriptions of different speech received from the automatic speech recognition systems 202. For example, the transcription correction system 204 can receive, and subsequently correct a transcription of first speech from a first automatic speech recognition system and receive, and subsequently correct a transcription of second speech from a second automatic speech recognition system.

The transcription correction system 204 can correct transcriptions agnostically to the automatic speech recognition systems 202 used to create the transcriptions. Specifically, the transcription correction system 204 can receive, and subsequently correct transcriptions of the same speech received from different automatic speech recognition systems of the automatic speech recognition systems 202. For example, the transcription correction system 204 can correct a transcription of speech created by a Google® ASR system and also correct a transcription of the same speech created by a Soundhound® ASR system. Further in the example, as the transcription correction system 204 can correct transcripts agnostic as to the system/methods/models used to create the transcriptions, the transcription correction system 204 can correct the transcriptions received from the Google® ASR system and the Soundhound® ASR system even if the transcriptions are different from each other.

In various embodiments, the transcription correction system 204 can correct transcriptions without access to one or more ASR models used to create the transcriptions by the automatic speech recognition systems 202. In correcting transcriptions without access to ASR models used to create the transcriptions, the transcription correction system 204 can correct the transcripts agnostic as to the vendor/ASR model used to create the transcripts. In turn, this allows for correction of different transcription errors that occur as a result of applying different vendor/ASR models to create the transcriptions.

In correcting a transcription, the transcription correction system 204 can correct an entry in a transcription. An entry in a transcription can include a portion of a word in the transcription, an entire word in the transcription, a phrase in the transcription, a sentence in the transcription, a paragraph in the transcription, or any other applicable portion of the transcription. Additionally, in various embodiments, an entry in a transcription can include the entire transcription itself.

The transcription correction system 204 can correct a transcription based on a domain associated with speech used to create the transcription. A domain associated with speech used to create a transcription can include applicable information related to one or more speakers uttering the speech and one or more listeners/parties associated with the speech. For example, a domain associated with a speech can include a title of a speaker uttering the speech, a company associated with the speaker uttering the speech, a location of the speaker uttering the speech, a title of the speaker uttering the speech, a language/dialect used by the speaker, a job of the speaker uttering the speech, a title of a listener to the speech, a company associated with the listener, a location of the listener, a title of the listener, a job of the listener, and other applicable information related to the speaker of the speech and party/listener to the speech.

The transcription correction system 204 can correct a transcription based on a context associated with speech used to create the transcription. A context associated with speech used to create a transcription can include application information related to the speech itself. For example, a context associated with a speech can include a subject matter of the speech, people referenced in the speech, characteristics of the people referenced in the speech, and other applicable information related to the speech itself.

A context associated with a speech can be specific to a domain associated with the speech. For example, a domain associated with a speech can include a division in a company and a context associated with the speech can include a name of a person within the division in the company who is either referenced in the speech or utters the speech. In another example, a domain associated with a speech can include a location where the speech is given and a context associated with the speech can include a project undertaken at the location. A context associated with a speech can include domain-specific contexts that are common words with modified meanings based on a domain associated with the speech. For example, a context associated with a speech can include product names that are common words in a language but have additional meaning within a company associated with the speech. In another example, a context associated with a speech can include proper names of people based on a domain associated with the speech, e.g. names of people who work for an entity associated with the speech.

Domain-specific contexts can be described by metadata related to a domain and a context associated with a domain. The following are examples of metadata describing domain-specific contexts:

Metadata describing of domain-specific contexts can include a list of transcripts from users speaking on the domain. For example, metadata can include a set of queries like "schedule a meeting from 2 to tree", "call car lee from marketing", etc. which are used in training, e.g. a model for performing mistranscription correction.

Further, metadata describing domain-specific contexts can include a ML model classifications of a query based on a domain-specific app structure. For example, for the transcript "call car lee from marketing", the correction model can identify the context that this is a "call person, meeting room" use case and that "car lee" should be corrected to a person's name.

Additionally, metadata describing domain-specific contexts can include a comprehensive set of entities. For example, in a meeting room application, a comprehensive set of entities can include a list of all people in an organization that can receive a call. In another example, in the food ordering use case, a comprehensive set of entities can include a list of all restaurants that can be ordered form and all dishes that can be ordered from the restaurants. In yet another example, in a music discovery use case, a comprehensive set of entities can include a set of all albums, artists, and song titles that can be discovered.

Metadata describing domain-specific contexts can include a list of aliases for entities. For example, "Bob" can be alias for a name entity "Robert." In another example, "pasta with tomato sauce" can be an alias for the dish entity "spaghetti marinara." In yet another example, "spring salad," "fresh mixed green salad," and "salad with apples and walnuts," can be aliases for a dish entity "house salad." In another example, "fridge" can be an alias for an appliance entity "refrigerator."

Further, metadata describing domain-specific contexts can include global domain contextual information that makes certain entities more likely than other entities, e.g. based on entity popularity or use frequency. For example, the popularity of a restaurant can help resolve to a more likely entity of "McDonald's" rather than "Mike Don Al's." In another example, the number of listens to a song can help resolve to a more likely entity of "Hey Jude" by the Beatles rather than "Hey Jude" by a cover band.

Additionally, metadata describing domain-specific contexts can include user or device metadata (past history, location, language or accent, etc.), that makes resolving certain entities more likely than resolving other entities. For example, given the context that a certain user is speaking (via pairing, face rec, speaker rec, personal device id, etc.), can personalized entity correction can be performed. Further in the example, entities can be resolved to people most likely to receive a call based on previous interaction history or org distance. In another example, entities can be resolved to artist names/song titles often listened to by a user. In yet another example, entities can be resolved to restaurant names in reasonable close proximity to a user's location.

Metadata describing domain-specific contexts can also include a knowledge base containing data in the domain. For example, in a meeting room use case, the data can include information such as title, group, location, etc. of people in an organization. In another example, in a food ordering use case, the data can include reviews, dishes, relationship of what dishes are available, what restaurants are available, ingredients in dishes, and the like.

As part of correcting a transcription, the transcription system 204 can replace a mistranscribed entry with a correct entry. A correct entry, as used herein, can include an entry that is either a correct transcription of speech uttered by a speaker, or an improved upon transcription of the speech, as compared to a transcription created by the automatic speech recognition systems 202. For example, if a transcription misspells five words in a transcription entry then a correct entry can include only one word misspelled in the transcription entry.

Once the transcription system 204 has replaced a mistranscribed entry with a correct entry to generate a corrected transcription, the transcription system 204 can present or otherwise send data for presenting the corrected transcription, e.g. to a client device 206. For example, the transcription correction system 204 can send data of a corrected transcription to the client device 206. Subsequently, the client device 206 can use the data of the corrected transcription to present the corrected transcription to a user, e.g. a speaker that uttered the speech of the transcription.

Figure 2B:
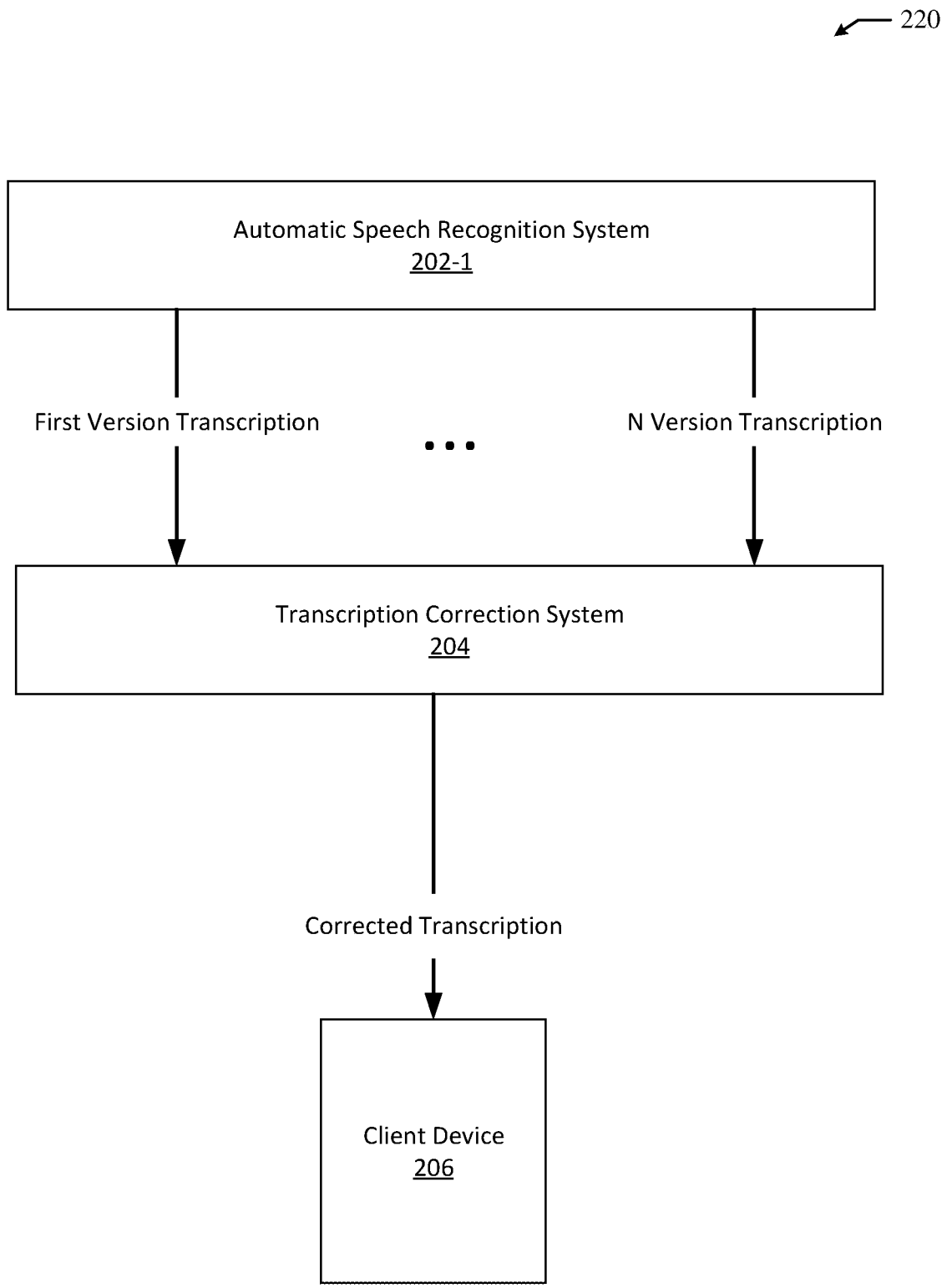
FIG. 2B shows another example environment for correcting transcriptions.

FIG. 2B shows another example environment 220 for correcting transcriptions. The example environment 220 shown in FIG. 2B includes the single ASR system 202-1, the transcription correction system 204, and the client device 206. As shown in the example environment 220 shown in FIG. 2B, the single ASR system 202-1 functions to provide multiple versions, N versions, of a transcription of the same speech to the transcription correction system. Subsequently, the transcription correction system 204 can use applicable transcription correction techniques, such as the transcription correction techniques described herein, to correct the multiple versions of the transcription to create a single corrected transcription. In particular, utilizing multiple alternate versions of transcriptions of the same speech can be utilized to create a more accurate corrected transcription of the speech, as opposed to using a single transcription of the speech to create a corrected transcription of the speech.

Figure 3:
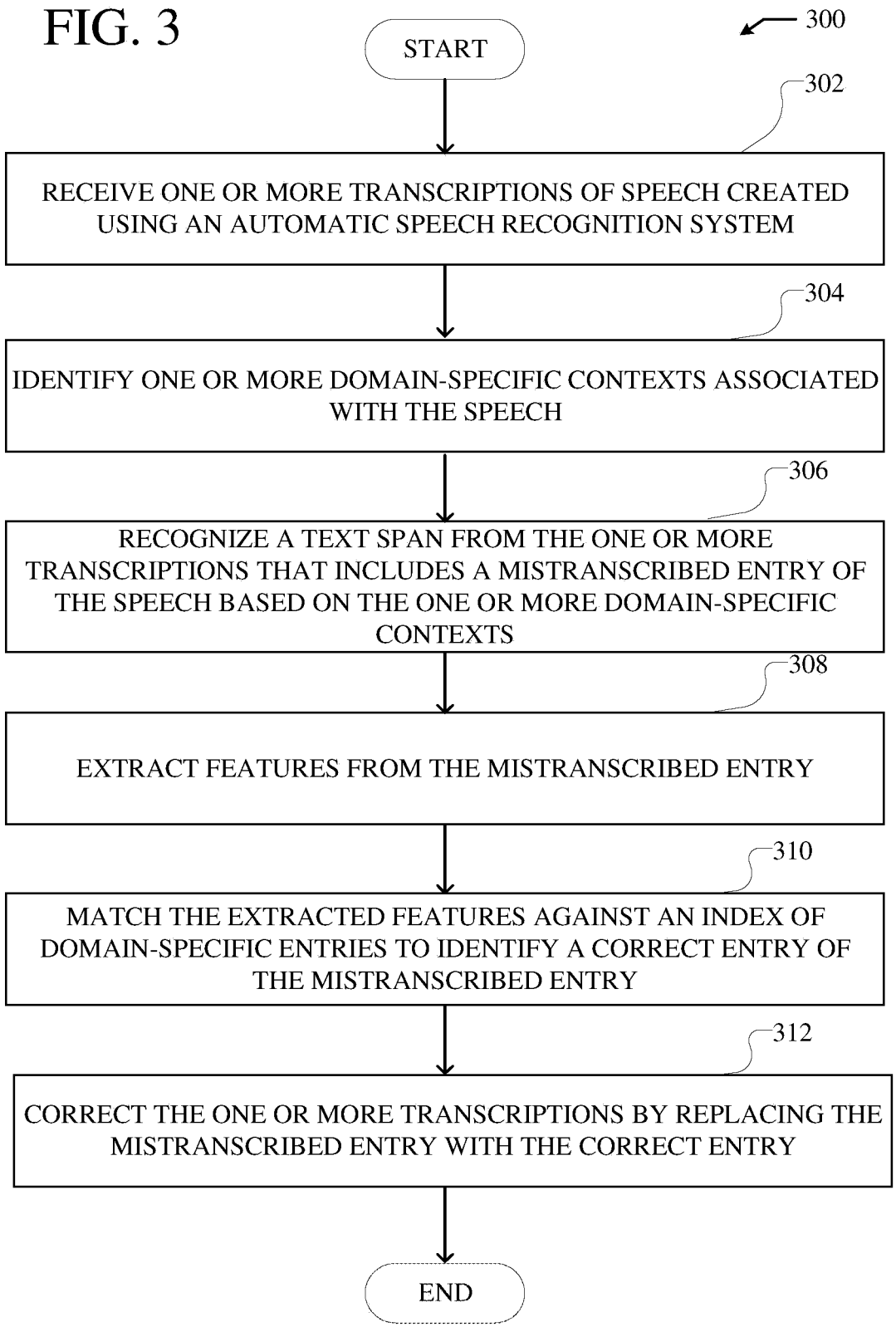
FIG. 3 shows a flowchart for an example method of correcting a transcription of a speech based on one or more domain-specific contexts associated with the speech.

FIG. 3 shows a flowchart 300 for an example method of correcting a transcription of a speech based on one or more domain-specific contexts associated with the speech. The method shown in FIG. 3 is provided by way of example, as there are a variety of ways to carry out the method. Additionally, while the example method is illustrated with a particular order of steps, those of ordinary skill in the art will appreciate that FIG. 3 and the modules shown therein can be executed in any order and can include fewer or more modules than illustrated.

Each module shown in FIG. 3 represents one or more steps, processes, methods or routines in the method. For the sake of clarity and explanation purposes, the modules in FIG. 3 are described with reference to the environment 200 shown in FIG. 2A and the environment 220 shown in FIG. 2B.

At step 302, the transcription correction system 204 receives one or more transcriptions of speech created using ASR from one of the automatic speech recognition systems 202. The transcription correction system 204 can be implemented, at least in part, in a cloud computing environment and receive the transcription in the cloud computing environment from the automatic speech recognition systems 202. Further, the transcription correction system 204 can be implemented, at least in part, at a local computing device and receive the transcription at the local computing device from the automatic speech recognition systems 202.

At step 304, the transcription correction system 204 identifies one or more domain-specific contexts associated with the speech. The domain-specific contexts associated with the speech can be identified using applicable information from an applicable source for identifying domain-specific contexts associated with transcribed speech. In particular, the domain-specific contexts can be identified from one or more speakers in the transcribed speech, a location where the speech occurred, an entity associated with the speech, and the actual transcription of the speech itself. For example, proper nouns in the transcription of the speech can be utilized to identify the domain-specific contexts associated with the speech. In another example, if the speech occurred at a specific conference room of a company, then the domain-specific contexts associated with the speech can be identified based on the speech occurring at the specific conference room of the company.

At step 306, the transcription correction system 204 recognizes a text span from the one or more transcriptions that includes a mistranscribed entry of the speech based on the one or more domain-specific contexts. The text span that includes the mistranscribed entry can be recognized, as will be discussed in greater detail later, by applying one or more domain-specific extractors to the transcription. Further, domain-specific extractors can be applied to the text span that includes the mistranscribed entry to actually recognize the mistranscribed entry within the text span. For example, the domain-specific extractors can be applied to the transcription to recognize a sentence in the transcription that includes a mistranscribed entry. Further in the example, the domain-specific extractors can be applied to the sentence that includes the mistranscribed entry to actually recognize one or more mistranscribed words in the sentence that are the mistranscribed entry in the sentence.

As will be discussed in greater detail later, domain-specific extractors can be trained based on text spans associated with certain domain-specific contexts. The domain-specific extractors can be trained based on transcriptions of queries spoken by employees booking conference rooms, so an example transcript would be "Please book the meeting in the Acquerello conference room. In particular, the domain-specific extractors applied to the transcription, at step 306, can be trained based on text spans, e.g. from previous transcriptions, within the domain-specific contexts associated with the current transcription. For example, if the transcription is associated with specific employees, then a domain-specific extractor trained with past transcriptions of speech made by the employees can be applied to the transcription to recognize mistranscribed entries in the transcription. Accordingly, the domains-specific extractors can be selected and applied to the transcription based on the domain-specific contexts associated with the transcription.

At step 308, the transcription correction system 204 extracts features from the mistranscribed entry. Features of the mistranscribed entry can include applicable attributes of the mistranscribed entry that can be used to characterize the mistranscribed entry and subsequently identify a corrected entry for the mistranscribed entry. Specifically, features of the mistranscribed entry, as will be discussed in greater detail later, can include one or a combination of phonetic features, textual features, and contextual features of the mistranscribed entry. Phonetic features, as will be discussed in greater detail later, can include phonetic units of a sequence of transcribed characters included in the mistranscribed entry. Textual features, as will be discussed in greater detail later, can include character units, e.g. n-grams, and normalized keywords in a sequence of transcribed characters in the mistranscribed entry. Contextual features, as will be discussed in greater detail later, can include contexts associated with the mistranscribed entry, e.g. contextual features identified with collaboration of an enterprise associated with the mistranscribed entry. For example, a contextual feature can include that a specific user uttered a name in the mistranscribed entry. Further in the example, based on this contextual feature it is more likely that the user uttered the name of somebody in their contact list.

The transcription correction system 204 can use applicable models, e.g. machine learning models, to extract features from the mistranscribed entry. Further, the transcription correction system 204 can use applicable domain-specific and/or context-specific models to extract features from the mistranscribed entry. In particular, the transcription correction system 204 can apply models associated with a domain and/or context of the transcribed speech to extract features from the mistranscribed entry. For example, if the transcription was made for users speaking a specific dialect, then the transcription correction system 204 can apply a model trained based on the dialect to extract features from the mistranscribed entry of the transcription. As will be discussed in greater detail later, one or a combination of a domain-specific phonetic model, a domain-specific textual model, and a domain-specific contextual model can be applied by the transcription correction system 204 to extract corresponding phonetic features, textual features, and/or contextual features from the mistranscribed entry.

At step 310, the transcription correction system 204 matches the extracted features against an index of domain-specific entries to identify a correct entry of the mistranscribed entry. The transcription correction system 204 can use an applicable information retrieval mechanism to match the extracted features against an index of domain-specific entries. An information retrieval mechanism, as used herein, can include a mechanism for finding information, e.g. unstructured information, which meets specific requirements/needs from a large collection of information, e.g. a large collection of unstructured information. For example, the transcription correction system 204 can use term frequency-inverse document frequency-based information retrieval to match the extracted features against the index of domain-specific entries to identify a correct entry of the mistranscribed entry.

The index of domain-specific entries can be selected based on the one or more domain-specific contexts associated with the speech. For example, the index of domain-specific entries can include a directory/hierarchy of a company associated with the speech. In another example, the index of domain-specific entries can include a list of products and common terms to describe products manufactured by a company associated with the speech.

At step 312, the transcription correction system 204 corrects the one or more transcriptions by replacing the mistranscribed entry with the correct entry. In correcting the transcription, the transcription correction system 204 can generate data of the corrected transcription. Subsequently, the transcription correction system 204 can provide the corrected transcription data to an applicable device, e.g. the client device 206, for displaying the corrected transcription.

Figure 4A:
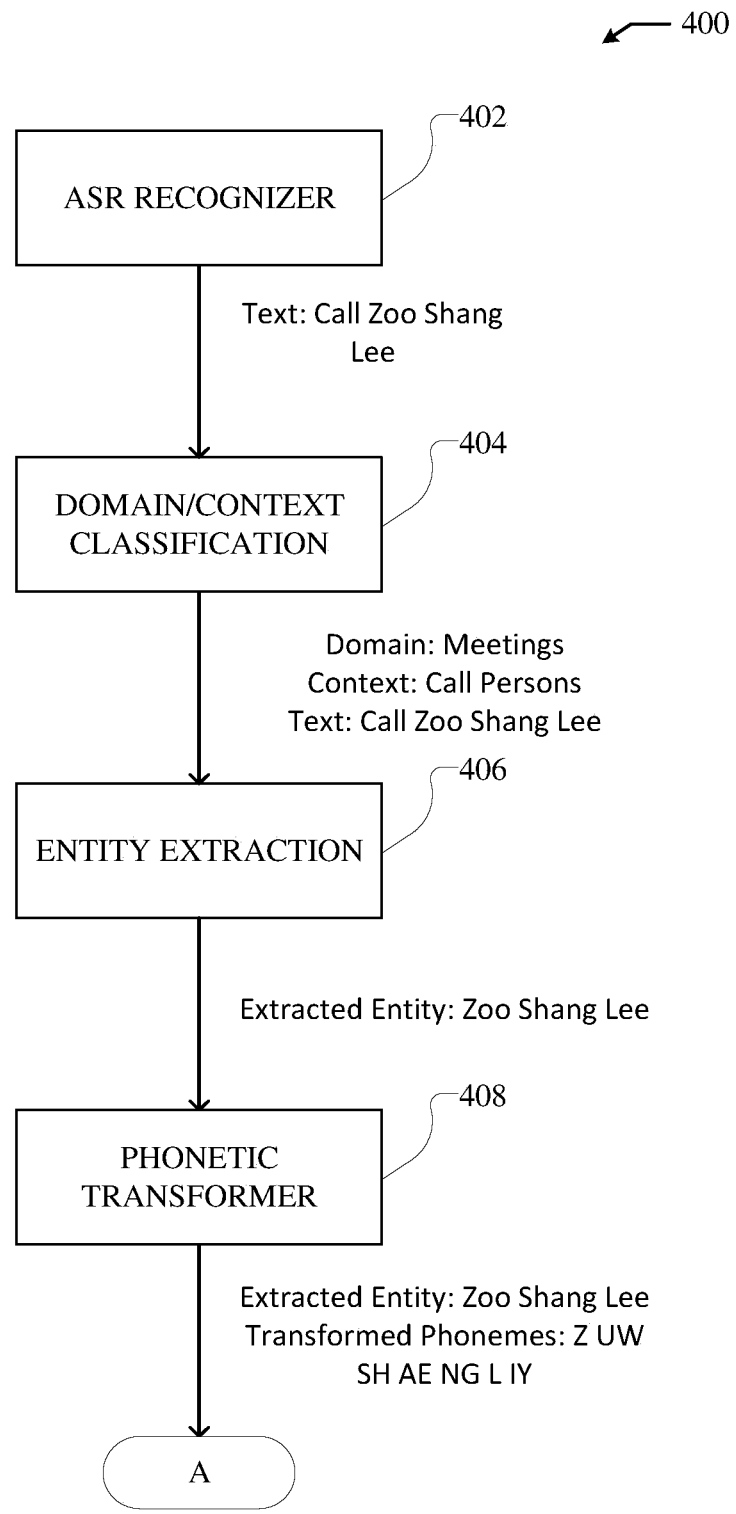
FIGS. 4A and 4B show an example flow for correcting a mistranscribed entry in a transcription of speech.
Figure 4B:
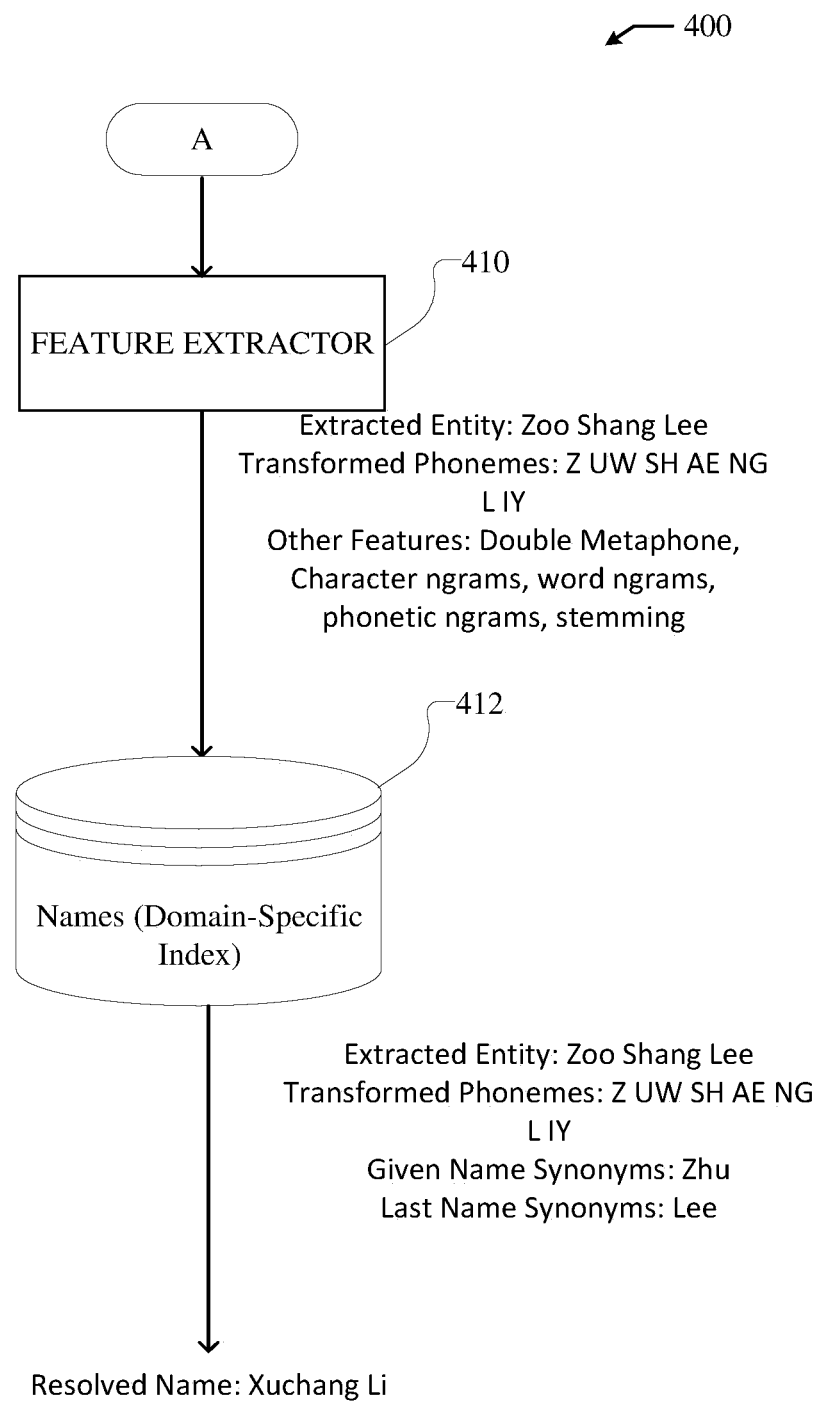

FIGS. 4A and 4B show an example flow 400 for correcting a mistranscribed entry in a transcription of speech.

In this approach, at step 402, an ASR recognizer can recognize speech to create a transcription. As will be discussed in greater detail later, one or a combination of machine learning techniques, specifically natural language processing (hereinafter referred to as "NLP"), can be applied to extract an entry from the ASR transcript, created at step 402, that needs to be corrected. The flow 400 is discussed with respect to an example mistranscribed entry of "Call Zoo Shang Lee".

At step 404, a domain and context of the ASR transcript are identified. The domain and context can be identified by using domain/intent/entity extractors. The extractors can be trained on an applicable domain-specific set of queries, e.g. a collaboration use case of queries, and utilized to determine if a particular entry needs to be corrected. Then, at step 406, the in-domain/context entry for correction, e.g. a person's name, can be extracted. In various embodiments, a text classification and sequence tagging model can be used to determine whether an entry needs to be corrected and subsequently extract the entry from the transcription, at steps 404 and 406. For example, logistic regression and maximum entropy Markov models can be applied to recognize a text span that includes an entry for correction and subsequently extract the entry for correction. With respect to the example discussed in the flow 400, the domain of meetings and the context of join meetings can be classified and used to recognize the mistranscribed entry "Call Zoo Shang Lee".

At step 408, a phonetic transformer is applied to the transcription. While the phonetic transformer is shown as being applied after entity/mistranscribed entry extraction, in various embodiments, the phonetic transformer can be applied before the entry is extracted. In the example discussed in the flow 400, the phonetic transformer can be applied to recognize the phonetic units of the sequence "Zoo Shang Lee" as "Z UW SH AE NG L IY".

At step 410, features are extracted from the mistranscribed entry. Three broad categories of features: those for phonetic similarity, those for textual similarity, and contextual features, e.g. from enterprise collaboration, can be extracted.

With respect to phonetic features, a domain-specific phonetic model can be applied to extract the features. Specifically, a double metaphone, or grapheme-to-phoneme (herein referred to as "G2P") model can be applied to extract the phonetic features. The G2P model is a neural machine translation (herein referred to as "NMT") model that converts a group of input characters into phonemes (phonetic units). Specifically, the G2P model can be a sequence to sequence deep learning model. The reason why the phonetic representation of the text is useful is because generic ASR systems use language models that are not trained on domain/context-specific data to constrain the final phoneme to character mappings.

In various embodiments, by extracting the phonemes of the utterance, the domain-specific context can be used to retrieve the correct character mapping. Accordingly, by recovering the original phonemes, a better domain match can be found since the matches are found based on phonetic similarity to the original audio rather than only those that are textually similar to the mistranscribed entry. This is a particularly important feature for cases where the correction is phonetically similar but textually different from the mistranscribed entry.

Further, textual features can be extracted from the mistranscribed entry at step 410, e.g. using a domain-specific textual model. Specifically, character n-grams, word-n-grams, edge n-grams, and normalized keywords can be extracted from the mistranscribed entry. Textual similarity is useful when the mistranscribed entry is textually close to the intended name. By using character n-grams, spelling variations, which are common for proper noun entities like names, can be taken into account in correcting the mistranscribed entry. For example, hard consonant sounds at the edges of tokens tend to contribute more to the notion of phonetic similarity than the middle sounds. Edge n-grams can account for this contribution from the hard consonant sounds at the edge of tokens.

Features extracted at step 410 can also include contextual features, e.g. identified through application of a domain-specific contextual model. For example, when a specific user is paired to a device, it can be assumed that the user is more likely to call someone that they often interact with or who is close to them in a company organizational chart. Based on this information, a personalization factor for each user and each query can be utilized to help correct the entry span to a name the user actually said.

At step 412, the extracted features are matched against an index of domain-specific entities using applicable information retrieval techniques like term frequency-inverse document frequency-based information retrieval. Each entry in the index can include the same features, e.g. phonetical, textual, and contextual features, that the extracted features are matched against, along with context/domain-specific contexts associated with the features. The closest match of the extracted features against the index can provide the corrected domain-specify entry. As discussed previously, once the mistranscribed entry is resolved, the resolved entry/correct entry can then replace the span of the original mistranscribed entry in the ASR transcription.

In the example discussed in the flow 400, the domain-specific index can include a list of names associated with either or both the identified domain, meetings, and the identified context, join meetings. Specifically, the domain-specific index can include collaboration interactions and organizational hierarchy data of the enterprise associated with the ASR transcription. As follows, by comparing the extracted features, the phonemes, the given name synonyms, and the last name synonyms, to the domain-specific index, the mistranscribed entry "Zoo Shang Lee" can be resolved to the correct name of "Xuchang Li". Specifically, people in conversational speech often do not use a proper canonical reference to an entity/entry. In turn, extracted features of an entry, phonemes of the entry, given name synonyms, last name synonyms, and synonyms/aliases associated with the entry can used to properly correct the entry when a user fails to correctly reference the entry. Synonyms, as used herein, can include aliases of an entry can include entries that are semantically similar to the entry but textually different from the entry. In particular, aliases of an entry can be semantically similar to the entry depending on a use case associated with the entry.

While the flow 400 shown in FIGS. 4A and 4B is discussed with respect to a single transcription, in various embodiments multiple transcriptions can be processed according to the flow 400 to provide one or more corrected transcriptions. For example, a plurality of alternate transcriptions of the same speech can be processed through the flow 400 in order to provide one or more corrected transcriptions of the speech.

Figure 5:
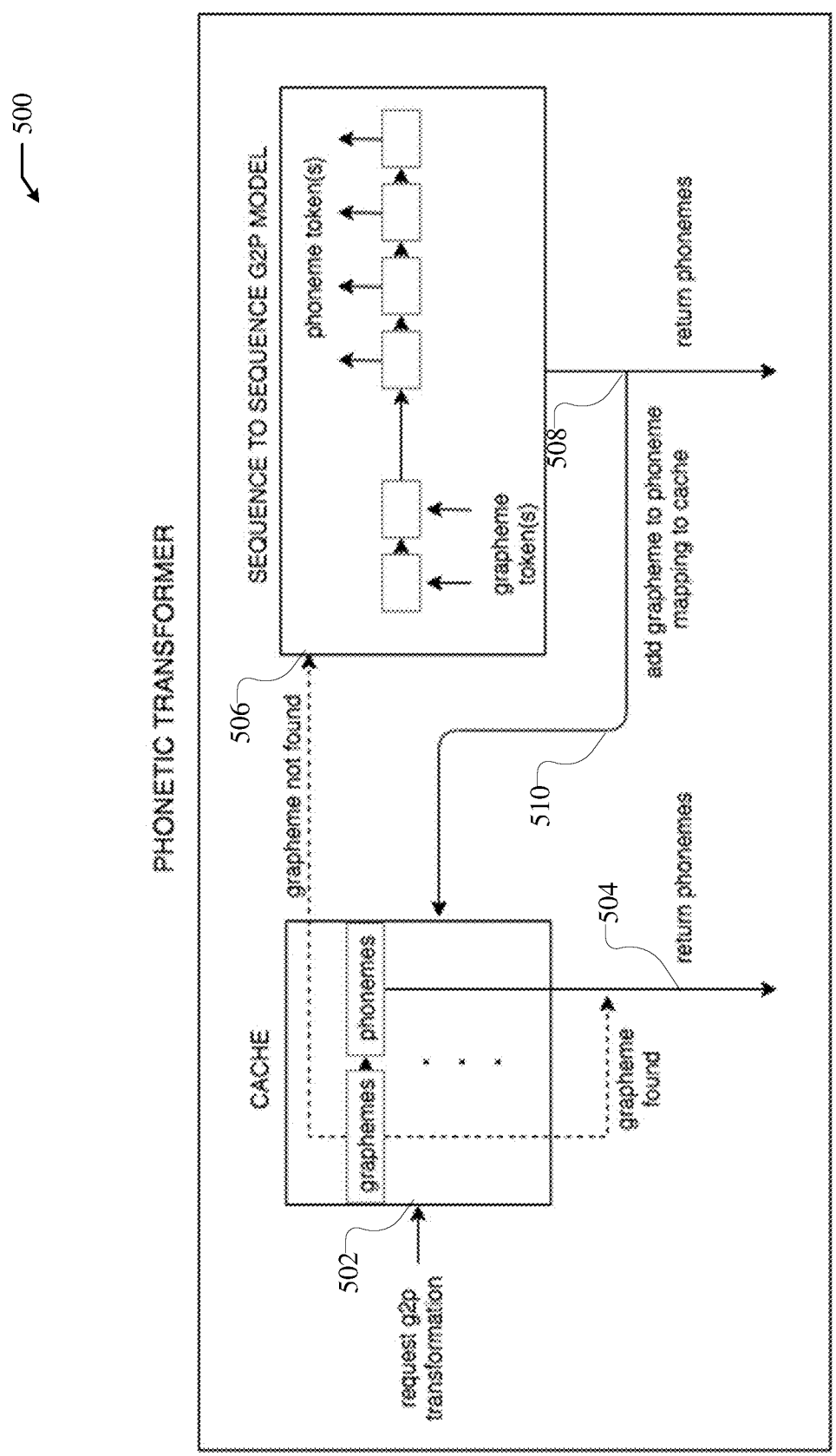
FIG. 5 shows an example grapheme to phoneme sequence to sequence based flow for performing phonetic transformation.

FIG. 5 shows an example grapheme to phoneme sequence to sequence based flow 500 for performing phonetic transformation. The example flow 500 shown in FIG. 5 can be applied an applicable phonetic transformer, such as the phonetic transform as shown in step 408 in FIG. 4. Further, it is appreciated that many other approaches other than the phonetic transformation flow 500 shown in FIG. 5 can be used for performing phonetic transformation. Many are algorithmic or rule based, while others use deep learning neural network models.

At point 502 in the flow 500, a caching system receives a grapheme to phoneme transformation request. The time of inference for deep learning models can be prohibitively high. To use these neural models in production, a caching system on top of the neural model which significantly decreases latency for previously seen graphemes. Specifically, the caching system can determine if a phoneme is found at the caching system for a grapheme of the grapheme to phoneme transformation request. If the grapheme is found in the caching system, then, at point 504 in the flow 500, a phoneme corresponding to the grapheme is returned from the caching system.

If the grapheme is not found in the caching system, then the flow 500 proceeds to point 506, where the grapheme is fed through a sequence to sequence G2P model. The sequence to sequence G2P model identifies a phoneme associated with the grapheme and returns the phoneme, at point 508 in the flow 500. Further, at point 510 in the flow 500, the phoneme for the grapheme, as identified by the sequence to sequence G2P model, is returned to the caching system and added to a mapping of graphemes to phonemes at the caching system. Subsequently, the mapping can be used to identify, at the caching system, the phoneme when the grapheme is fed to the caching system in the future. This can reduce the number of graphemes that are sent to the sequence to sequence G2P model, thereby helping to conserve computational resources.

Current ASR systems not only provide one transcript per utterance, but a set of "n-best" hypotheses. The hypotheses include "n" numbers of alternate transcripts per utterance due to the probabilistic nature of acoustic to grapheme mapping. In various embodiments, the techniques described herein can be applied to all or a subset of these hypotheses. Subsequently, extracted features derived from these alternate hypotheses can be aggregated to form a single request that is matched to a domain-specific index to correctly resolve a mistranscribed entry. Additionally, alternate transcripts can be compared to identify what entries need to be corrected based on variations in the entries between alternate transcripts. Utilizing "n-best" hypotheses to perform ASR transcript correction can increase the accuracy of mistranscribed entry resolution.

In various embodiments, the techniques for performing transcription correction, as described herein, can also be performed by correcting transcriptions based on common mistranscribed terms and entries. Specifically, a data set of common mistranscriptions for utterances can be generated. The data set of common mistranscriptions can be generated by collecting transcriptions of audio recordings of users uttering entries and collecting common mistranscription statistics based on the collected transcriptions. The mistranscribed texts/mistranscription statistics can then be added to a domain-specific index for use in matching extracted features to the domain-specific index including the mistranscribed texts/statistics for purposes of correcting mistranscribed transcriptions according to the techniques described herein.

For example, consider the name "Karthik", which typical ASR systems often mistranscribe as "car mechanic" or "gothic". After recognizing these common mistranscriptions, the text entries of 'car mechanic' and 'gothic' can be added as additional text fields to the entry for 'Karthik' in a domain-specific index. This increases the chances that the mistranscribed entries of "car mechanic" and "gothic" will be match against the "Karthik" when a new audio segment is mistranscribed in the same/similar way. In turn, the intended entry, "Karthik" can be resolved as the corrected entry to a transcription.

In various embodiments, class-based language modeling can be used for performing ASR transcription correction. Specifically, a class-based language model can be applied to partition words in a transcription into different classes. For example, words can be identified as context words, such as "join" or "call". In another example, words can be identified as proper names. In turn, by partitioning words into different classes, the number of parameters and corresponding data needed to train a statistical language model is much less than the amount of data needed to train a traditional n-gram language model. Specifically, a class-based statistical language model can be trained on a small domain-specific set of queries to provide a distribution of the surrounding context words using a large corpus of entries. Further, the class-based statistical language model can be trained on a large corpus of entries including popularity information of the entries in speech/transcriptions to learn in-domain class probabilities.

The class-based language model can then be used to perform maximum likelihood estimation and predict what query/actual utterance could have produced the mistranscribed entry. Specifically, the class-based language model can be applied to re-score each of the hypotheses in an n-best list of an ASR and re-rank these alternate hypotheses based on respective language model scores identified by applying the language model. The top hypothesis identified through post re-ranking is more likely to be the correct query/actual utterance since the class-based language model prefers (i.e., assigns higher scores to) transcripts which contain error-free entities as well as error-free context words. Once the ASR query has been corrected to form a corrected transcription using the class-based language model and this re-ranking technique, applicable other transcription correction techniques, such as those described herein, can be applied to further correct the transcription. In particular, this is useful for resolving to the correct entry in cases when none of the ASR n-best hypotheses contains the correct entry.

In various embodiments a sequence to sequence model can be used to perform the ASR transcription correction techniques described herein. Specifically, a sequence to sequence encoder-decoder with attention can be used as a model for correcting mistranscribed entries. The input to the model is the transcription. The model can be trained end to end to correct mistranscriptions of applicable text, whether it is a proper noun or not.

The sequence to sequence model can also be used with a gazetteer of domain specific data. Specifically, the input can be encoded with both word and character embeddings and any close gazetteer matches are can also be encoded using one-hot/bit vectors. The word/character/gazetteer encodings can be concatenated before feeding into the sequence to sequence model to train the model. Subsequently, the input of the model is the ASR transcription fed in token by token, and the output of the model is the fully corrected transcript.

In various embodiments, contextual information from multiple sources and media streams can be used for performing ASR transcription correction according to the techniques described herein. As discussed previously, organization hierarchy and interaction data can be used to perform ASR transcription correction. Additional contextual information sources can be used to perform ASR transcription correction.

With respect to video streams, face recognition can be used to perform ASR transcription correction. Specifically, visual geometry group ("VGG") type models can use deep learning to detect faces from video streams and recognize them to identify the user and others in the meeting room. Subsequently, the face recognition information can be used to better predict the person associated with a transcription and subsequently perform ASR transcription correction.

Additionally, lip reading can be used by aligning past video data on lip movement and transcripts, to train a model to learn phonemes based on such lip movement. These predicted phonemes can then be used to accurately construct domain-specific words from an ASR transcript.

Further, gesture recognition can be used to identify a person's gestures with respect to a device. Subsequently, such recognized gestures can be used to correct ASR transcriptions based on the recognized gestures.

In various embodiments, audio streams can be used to perform ASR transcription correction. Specifically, voice biometric techniques can be used to identify a user based on a fixed phrase (e.g., the wake phrase) uttered by them. The knowledge of the user's identity can then be used to correctly predict the name of the person called out in a transcription.

Further, by collecting and modeling audio streams of various people uttering person names, acoustic fingerprints can be constructed. The acoustic fingerprints can be matched against an internal corpus of audio fingerprints, to improve ASR transcription correction, e.g. by improving person name recall.

Additionally, paired user information can be used to perform ASR transcription correction. Specifically, based on paired user information, uncommon terms can be corrected given the context referred to by a user. For example, if someone calls a teammate with an uncommon name, there is a greater chance that the uncommon name will be transcribed correctly.

The disclosure now turns to FIGS. 6 and 7, which illustrate example computing devices, such as switches, routers, load balancers, client devices, and so forth.

FIG. 6 shows an example computing system 600 in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) 620 and random access memory (RAM) 625 to processor 610. Computing system 600 can include a cache 612 of high-speed memory connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

FIG. 7 illustrates an example network device 700 suitable for performing switching, routing, load balancing, and other networking operations. Network device 700 includes a central processing unit (CPU) 704, interfaces 702, and a bus 710 (e.g., a PCI bus). When acting under the control of appropriate software or firmware, the CPU 704 is responsible for executing packet management, error detection, and/or routing functions. The CPU 704 preferably accomplishes all these functions under the control of software including an operating system and any appropriate applications software. CPU 704 may include one or more processors 708, such as a processor from the INTEL X86 family of microprocessors. In some cases, processor 708 can be specially designed hardware for controlling the operations of network device 700. In some cases, a memory 706 (e.g., non-volatile RAM, ROM, etc.) also forms part of CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HS SI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 704 to efficiently perform routing computations, network diagnostics, security functions, etc.

Although the system shown in FIG. 7 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC), which can be configured to perform routing and/or switching operations. The ASIC can communicate with other components in the network device 700 via the bus 710, to exchange data and signals and coordinate various types of operations by the network device 700, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   receiving a transcription of speech created using an automatic speech recognition system;
   identifying one or more domain-specific contexts associated with the speech;
   identifying a mistranscribed entry of the speech based on a user-specific context included in the one or more domain-specific contexts associated with the speech and a domain-specific sequence to sequence grapheme-to-phoneme model;
   determining a correct entry for the mistranscribed entry based on features included in the mistranscribed entry; and
   correcting the transcription by replacing the mistranscribed entry with the correct entry.

2. The method of claim 1, wherein the features include one or more user specific contextual features and one or more phonetic features.

3. The method of claim 2, further comprising:
   applying a user-specific extractor to identify the one or more user specific contextual features in the mistranscribed entry; and
   applying the domain-specific sequence to sequence grapheme-to-phoneme model to identify the one or more phonetic features in the mistranscribed entry.

4. The method of claim 2, wherein determining the correct entry comprises: matching the features against an index of domain-specific entries to identify the correct entry.

5. The method of claim 2, wherein the mistranscribed entry is matched to the correct entry based on the one or more phonetic features of the mistranscribed entry and phonetic features of the correct entry using term frequency-inverse document frequency-based information retrieval.

6. The method of claim 4, wherein the index of domain-specific entries is selected based on the one or more domain-specific contexts associated with the speech.

7. The method of claim 1, wherein the mistranscribed entry is detected by applying one or more domain-specific extractors trained based on text spans in the one or more domain-specific contexts to the transcription.

8. A system comprising:
one or more processors; and
at least one computer-readable storage medium having stored therein instructions which, when executed by the one or more processors, cause the one or more processors to:
receive a transcription of speech created using an automatic speech recognition system;
identify one or more domain-specific contexts associated with the speech;
identify a mistranscribed entry of the speech based on a user-specific context included in the one or more domain-specific contexts associated with the speech and a domain-specific sequence to sequence grapheme-to-phoneme model;
determine a correct entry for the mistranscribed entry based on features included in the mistranscribed entry; and
correct the transcription by replacing the mistranscribed entry with the correct entry.

9. The system of claim 8, wherein the features include one or more user specific contextual features and one or more phonetic features.

10. The system of claim 9, wherein the one or more processors are further configured to:
apply a user-specific extractor to identify the one or more user specific contextual features in the mistranscribed entry; and
apply the domain-specific sequence to sequence grapheme-to-phoneme model to identify the one or more phonetic features in the mistranscribed entry.

11. The system of claim 9, wherein the one or more processors are further configured to determine the correct entry by:
matching the features against an index of domain-specific entries to identify the correct entry.

12. The system of claim 11, wherein the mistranscribed entry is matched to the correct entry based on the one or more phonetic features of the mistranscribed entry and phonetic features of the correct entry using term frequency-inverse document frequency-based information retrieval.

13. The system of claim 11, wherein the index of domain-specific entries is selected based on the one or more domain-specific contexts associated with the speech.

14. The system of claim 8, wherein the mistranscribed entry is detected by applying one or more domain-specific extractors trained based on text spans in the one or more domain-specific contexts to the transcription.

15. One or more non-transitory computer-readable media comprising computer-readable instructions which, when executed by one or more processors, cause the one or more processors to:
receive a transcription of speech created using an automatic speech recognition system;
identify one or more domain-specific contexts associated with the speech;
identify a mistranscribed entry of the speech based on a user-specific context included in the one or more domain-specific contexts associated with the speech and a domain-specific sequence to sequence grapheme-to-phoneme model;
determine a correct entry for the mistranscribed entry based on features included in the mistranscribed entry; and
correct the transcription by replacing the mistranscribed entry with the correct entry.

16. The one or more non-transitory computer-readable media of claim 15, wherein the features include one or more user specific contextual features and one or more phonetic features.

17. The one or more non-transitory computer-readable media of claim 16, wherein the execution of the computer-readable instructions further cause the one or more processors to:
apply a user-specific extractor to identify the one or more user specific contextual features in the mistranscribed entry; and
apply the domain-specific sequence to sequence grapheme-to-phoneme model to identify the one or more phonetic features in the mistranscribed entry.

18. The one or more non-transitory computer-readable media of claim 16, wherein the execution of the computer-readable instructions further cause the one or more processors to determine the correct entry by:
matching the features against an index of domain-specific entries to identify the correct entry, wherein the index of domain-specific entries is selected based on the one or more domain-specific contexts associated with the speech.

19. The one or more non-transitory computer-readable media of claim 16, wherein the mistranscribed entry is matched to the correct entry based on the one or more phonetic features of the mistranscribed entry and phonetic features of the correct entry using term frequency-inverse document frequency-based information retrieval.

20. The one or more non-transitory computer-readable media of claim 15, wherein the mistranscribed entry is detected by applying one or more domain-specific extractors trained based on text spans in the one or more domain-specific contexts to the transcription.

* * * * *